Patented Sept. 12, 1944

2,358,286

UNITED STATES PATENT OFFICE 2,358,286

CHROMANES AND PROCESSES FOR PRODUCING THE SAME

Otto Hromatka, Darmstadt, Germany, assignor to Merck & Co., Inc., Rahway, N. J., a corporation of New Jersey No Drawing. Application December 2, 1939, Serial No. 307,265. In Germany January 31, 1939

23 Claims. (Cl. 260—333)

This invention relates to organic chemical compositions and compounds of the chromane and substituted chromane type, to intermediates for the production of such compounds, and to processes for their production.

Such chromanes and substituted chromanes exhibit the biological action of the tocopherols, i. e., vitamin E.

The syntheses of such compounds now available involve the use of hydroquinones as starting materials. For instance, one of the known processes involves the use of pseudocumohydroquinone (3,6-dihydroxy-1,2,4-trimethyl benzene) with phytol or phytol derivatives. Pseudocumohydroquinone is a difficultly obtainable substance, and the processes now known for its production are impracticable and result in only very small yields.

When xylohydroquinone is reacted with phytol or phytol derivatives a mixture of several substances is obtained in addition to the desired hydroxy chromane, such as condensation products formed by the substitution of two phytyl radicals in the molecule.

According to the determinations of Karrer and his co-workers (Helv. Chim. Acta, vol. 21, pages 823, 1234; vol. 22, page 661) such by-products can only be separated with great difficulty from the reaction product desired.

It will be apparent then that the syntheses of the tocopherols now available are unsatisfactory from a practical point of view, because of the difficulty of obtaining the starting materials required in the various reactions.

I have now discovered a new synthesis for these important biologically active products, which synthesis avoids the use of hydroquinones as starting materials. My process involves the use of 6-hydroxybenzenes of the formula

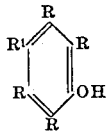

wherein R may be hydrogen or methyl, one R ortho to the hydroxyl group always being hydrogen, and $R^1$ may be a group selected from the group consisting of amino, amino hydrochloride and acylamino radicals as starting material.

These compounds are condensed with dienes such as phytadiene, dimethylbutadiene, isoprene, etc., or with allylic halides such as, for example, phytyl bromide, dimethyl allyl bromide, etc., or the corresponding alcohols, such as phytol, for example, to produce chromanes which are substituted in position 2 by an alkyl radical, and in position 6 by a group which may be converted to a hydroxyl group. The reaction may be carried out in the presence of an acidic catalyst, such as zinc chloride, or formic acid, for example.

6-hydroxybenzenes substituted at position 3 by amino, acylamino, benzylamino, nitro- or nitroso radicals, or by a sulfonic acid group, or a halogen group, may be employed in the process according to my invention. Particularly suitable are the 6-hydroxy-3-amino- or 3-nitro- benzenes.

Where 3-aminobenzenes are employed as starting material, the amino group is preferably protected during the condensation reaction, as for example, by means of acylation, especially formylation. If formylation is carried out by heating the selected benzene with formic acid ester, or formic acid, no esterification of the phenolic hydroxyl group takes place, but merely the complete formylation of the amino group. The amino group can also be protected by benzylation. The groups employed for blocking or protecting the amino group may be cleaved off by hydrolysis, in the case of acyl compounds, preferably by acid compounds; in those cases where the amino group is protected by benzylation, the benzyl radical may be split off as toluene by catalytic hydrogenation.

Where 3-nitrobenzenes are employed as starting materials in the reaction, the nitro group is converted to an amino group. The products of the reaction between 3-nitrobenzenes and the phytol or phytol derivatives, or allyl halides are worked up in such a manner that residues of the 3-nitro-6-hydroxybenzenes used may be eliminated by means of aqueous alkalis. Because of the presence of the nitro group, the acid nature of the phenolic hydroxyl group appears to be intensified, and therefore these compounds can be shaken out even with dilute or weakly alkaline materials, for example, with soda solution, and the 6-nitrochromane derivatives, which are easily soluble in alcohol, can be separated from the conversion products that are insoluble in alcohol, and can be purified by distillation under high vacuum. It is also possible to catalytically hydrogenate the alcoholic solution of the unpurified substituted 6-nitrochromane, and then purify the substituted 6-aminochromane thus obtained by chromatographing its benzine solution on aluminum oxide, or by the salt formation.

It is also possible to isolate the obtained 6-amino-chromane derivatives by means of their salts with organic dibasic acids such as oxalic acid, d-tartaric acid or malic acid in the molecular proportion of one molecule of the 6-aminochromane and half a molecule of the acid. These well crystallising salts are sparingly soluble in alcohol.

The 3-nitro-6-hydroxybenzenes which may be employed as starting materials for the processes of my invention are stable compounds and are not susceptible to atmospheric oxygen. They are readily soluble in the organic solvents used in the condensation, as for example, in benzine or in formic acid. The 6-nitrochromanes obtained in the condensation are likewise not subject to oxidation. Furthermore, they can be readily distilled under high vacuum without decomposition and can thus be easily separated from any by-products.

The 3-aminochromanes obtained according to my invention may be converted to 6-hydroxychromanes by diazotizing and boiling, even though these compounds have very weakly basic properties, their salts being usually hydrolyzed completely with water, and the base being shaken out with ether. Diazotization may be successfully carried out even in spite of the very high general susceptibility to oxidation of amines of this type. I have found that on boiling an aqueous alcoholic solution of the diazonium salts, there occurs chiefly a combination with the hydroxyl group instead of with the originally present amino group, and not, as is usually the case when boiling alcoholic solutions of diazonium salts, a combination with an —OC$_2$H$_5$ group or with a hydrogen atom.

The 6-aminochromanes obtained as intermediates in the present process can also be converted into 6-hydroxychromanes, i. e., α-tocopherol or its homologs, by oxidation, hydrolysis of the quinonimines thus obtained, and hydrogenation of the quinones. The reduction or hydrogenation may be effected with zinc dust or with other usual reducing agents, in presence of acids.

When 3-nitro- or 3-amino-1,2,4-trimethyl-6-hydroxybenzenes are employed in the reaction, the corresponding alkylated 6-hydroxychromane is obtained which is identical with d,l-α-tocopherol, as determined by the absorption spectrum, by formation of the allophanate derivative, and by the high vitamin E activity which it exhibits on animals.

When higher or lower homologs of 3-nitro- or 3-amino-1,2,4-trimethyl-6-hydroxybenzenes are employed, the resulting product is a corresponding higher or lower homolog of d,l-α-tocopherol.

The products produced according to my invention exhibit a high degree of vitamin E activity. Furthermore, the 6-acylaminochromanes and the free 6-aminochromanes which can be used advantageously in the form of their crystalline salts, also exhibit a high degree of vitamin E activity; d,l-α-tocopherol itself does not form crystalline salts.

The aminochromanes have the further advantage over d,l-α-tocopherol and its homologs in that the latter compound is easily oxidizable, whereas the aminochromanes especially in form of their salts, are not sensitive to atmospheric oxygen.

The following flow sheet illustrates the reactions described herein in terms of 1,2,4-trimethyl-6-hydroxy-3-aminobenzene and phytol.

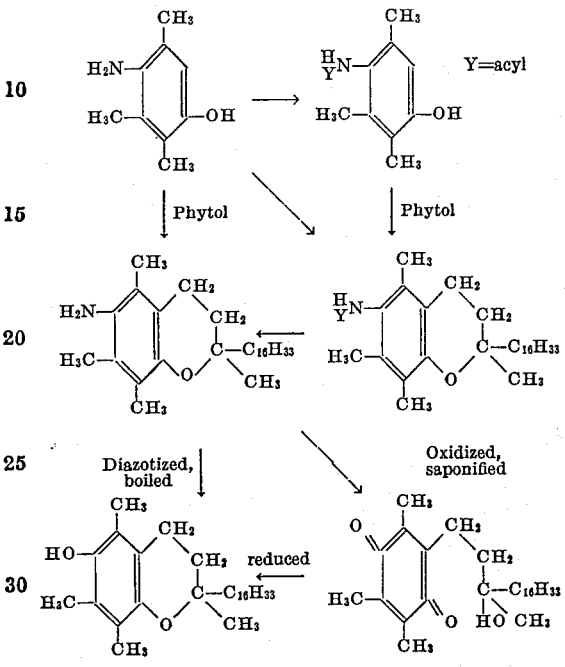

d, l-α-Tocopherol

It will be apparent that the reactions illustrated are analogous for the other 6-hydroxybenzenes substituted at position 3 by a group selected from the group consisting of amino, amino hydrochloride, and acylamino radicals.

In the following examples there are given detailed descriptions of the various reactions referred to herein. However, it will be apparent to those skilled in the art that various modifications may be made therein without departing from the spirit and scope of the invention herein described and claimed.

*Example I*

120 gms. of 3-amino-6-hydroxy-1,2,4-trimethybenzene (obtained by the catalytic reduction of the nitroso compound from 1,2,4-trimethyl-3-hydroxybenzene described by Nietzky and Schneider, B 27, 1431 [1894] is heated with 240 cc. of 99% formic acid for 3 hours under refluxing at 100° C. The formyl compound crystallizes out from the solution on cooling and is filtered with suction. By evaporating the mother liquors under vacuum and again treating the residue with formic acid, an almost theoretical yield of 3-formylamino-6-hydroxy-1,2,4-trimethylbenzene may be obtained.

7.2 gms. of 3-formylamino-6-hydroxy-1,2,4-trimethylbenzene, 12.0 gms. of phytol, and 60 cc. of 99% formic acid are boiled for 5 hours with refluxing. On cooling, the solution is highly diluted with water and the separated oil is extracted with ether. The ether solution is shaken well with water and with an aqueous N-2 sodium hydroxide solution until the liquors remain highly alkaline using phenolphthalein as an indicator. The ether solution is dried and evaporated. The oily residue is dissolved in petroleum ether and chromatographed on aluminum oxide. The chromatogram is developed with an abundant amount of petroleum ether. A small amount of a colored compound is retained in the upper end of the column, then a wide zone follows containing the desired chromane which is bounded again in the lower part of the column by a narrow zone of a colored compound. Some unconverted phytol and its transformation products are not absorbed. The wide, colorless zone is extracted with a mixture of 9 parts ether and 1 part methanol and the solution obtained is evaporated to dryness. 2,5,7,8-tetramethyl-2,(4',8',12'-trimethyl-tridecyl)-6-formylaminochromane is obtained as a colorless, viscous oil, which crystallizes slowly.

The same chromane may be obtained by the conversion of an equivalent amount of 3-amino-6-hydroxy-1,2,4-trimethylbenzene, in place of 3-formylamino-6-hydroxy-1,2,4-trimethylbenzene, with phytol and formic acid. The working up is effected in the same way.

6.0 gms. of 2,5,7,8-tetramethyl-2-(4',8',12'-trimethyl-tridecyl)-6-formylaminochromane is dissolved in 120 cc. of warm 10% absolute alcoholic hydrochloric acid, treated with 26 cc. of water and boiled for an hour under refluxing. The hydrochloride of 2,5,7,8-tetramethyl-2-(4',8',12'-trimethyl-tridecyl)-6-aminochromane crystallizes out on cooling. The yield amounts to 5.7 gms. or 93% that of theory. The compound melts at about 158–160° C. and has been found to exhibit vitamin-E activity in tests with animals.

Instead of chromatographing the 2,5,7,8-tetramethyl-2-(4',8',12'-trimethyl-tridecyl)-6-formylaminochromane it is possible to treat the crude product in the described manner with aqueous-alcoholic hydrochloric acid. The solution is highly diluted with water and the oil is extracted with ether. The ether solution is shaken with a cold soda solution and evaporated to dryness. The residual crude 2,5,7,8-tetramethyl-2(4',8',12'-trimethyl-tridecyl)-6-aminochromane is treated with the calculated amount of oxalic acid in alcoholic solution. The crystallised oxalic acid salt has the composition $C_{29}H_{51}ON \cdot \frac{1}{2}C_2H_2O_4$ and melts at 153° C.

0.932 gm. of 2,5,7,8-tetramethyl-2-(4',8',12'-trimethyl-tridecyl)-6-aminochromane hydrochloride is dissolved in 8 cc. of absolute alcohol and treated with 0.5 cc. of 35% hydrochloric acid. The solution is cooled with ice and treated with 2.2 cc. of a normal sodium nitrite solution drop by drop. The solution is allowed to stand in the cold for a longer period of time, then it is diluted with 150 cc. of water and the solution is boiled with refluxing while passing through an inert gas. Nitrogen is evolved. Simultaneously an oil separates out. This is taken up wth petroleum ether, chromatographed and developed with petroleum ether. The colorless wide zone bordered with two yellow zones is extracted with ether-methanol (9:1). The residual oil, on evaporating the solvent, is d,l-α-tocopherol.

Example II 18.8 gms. of 3-amino-6-hydroxy-1,2,4-trimethylbenzene hydrochloride (obtained by the catalytic reduction of the 3-nitroso compound from 1,2,4-trimethyl-6-hydroxybenzene described by Nietzky and Schneider, B. 27, 1431 [1894] is suspended in 100 cc. of ice water and treated with 13.6 gms. of crystallized sodium acetate, containing 3 molecules of water of crystallization. The solution is shaken for an hour on the addition of 20.6 gms. of acetic anhydride. The mixture becomes solid after a short time, but it is possible to shake it further after energetic stirring. The crystals are filtered with suction and dried. The yield of 3-acetamino-6-hydroxy-1,2,4-trimethyl-benzene is almost quantitative. Melting point 185–186° C.

To a solution of 7.5 gms. of phytyl bromide in 100 cc. benzene is added 3.86 gms. of 3-acetamino-6-hydroxy-1,2,4-trimethylbenzene and 2.0 gms. of anhydrous zinc chloride. The mixture is refluxed until the evolution of hydrogen bromide is complete. On cooling, the benzene solution is decanted, washed with ammonia, 2.0 N sodium hydroxide, and water, dried with potassium carbonate and evaporated. The residue is dissolved in petroleum ether and chromatographed on aluminum oxide. The same chromatogram is obtained, as in the case of the corresponding formyl compound in Example I. The 2,5,7,8-tetramethyl-2-(4',8',12'-trimethyl-tridecyl)-6-acetamino chromane is obtained as a viscous oil, which crystallizes slowly. This compound is saponified in an aqueous-alcoholic solution of hydrochloric acid and is worked up to d,l-α-tocopherol as in Example I.

Example III 6.0 gms. of phytol are converted to phytyl bromide by means of phosphorus tribromide. [Analogous to the method of preparation of tetrahydrofarnesyl bromide described by Fischer, An. 475, 183 (1929).]

7.5 gms. of phytyl bromide are dissolved in 100 cc. of benzene and added to 3.6 gms. of 3-formylamino-6-hydroxy-1,2,4-trimethylbenzene and 1.8 gms. of anhydrous zinc chloride. The mixture is boiled for two hours under refluxing. The formylamino-hydroxy-trimethylbenzene dissolves quite rapidly and hydrogen bromide is evolved. On cooling, the benzene solution is decanted from the liquid zinc chloride and diluted with ether. This solution is washed in a separating funnel consecutively with ammonia, 2.0 N aqueous sodium hydroxide and water, then dried and evaporated in vacuum to dryness. The oily residue is dissolved in petroleum ether and purified as described in Example I. 2,5,7,8-tetramethyl-2-(4',8',12'-trimethyl-tridecyl)-6-formylamino chromane is obtained which is saponified to the free amino chromane with a 10% absolute alcoholic hydrochloric acid. This may be further worked up according to Example I, or according to the procedure described in the following example.

Example IV 0.932 gm. of 2,5,7,8-tetramethyl-2-(4',8',12'-trimethyl-tridecyl)-6-aminochromane hydrochloride is dissolved in 7 cc. of warm absolute alcohol, treated with 20 cc. water, whereby the solution becomes turbid. On the addition of 6 cc. of liquor ferri sesquichlorati DAB. 6, the mixture is heated for 1.5 hours on the steam bath. A brown oil is formed, which in extracted with ether. The residue obtained on evaporation of the ether solution is reduced in aqueous alcoholic hydrochloric acid with an excess of zinc dust, and the colorless solution is diluted with water. The d,l-α-tocopherol which separates out is dissolved in petroleum ether and purified by chromatographing on aluminum oxide. The compound is extracted with ether-methanol and yields as a residue, d,l-α-tocopherol.

Example V 6.6 gms. of 3-formylamino-2,4-dimethyl-6-hydroxybenzene (prepared by boiling 3-amino-2,4-dimethyl-6-hydroxybenzene with formic acid) and 12 gms. of phytol are boiled for six hours under refluxing in 60 cc. of 99% formic acid. After cooling, the mixture is diluted with much water and the oil which separates out is extracted with ether. The ethereal solution is shaken out first with water and then with 2 N aqueous sodium hydroxide, until the solution remains strongly alkaline to phenol-phthalein. The ether solution is dried with magnesium sulfate and evaporated. The oily residue is dissolved in 200 cc. of ordinary benzine, chromatographed on aluminum oxide, and developed with ordinary benzine. Narrow, colored zones at the upper and at the lower ends of the column are removed. The colorless, wide middle zone is eluted with a mixture of 9 parts of ether and 1 part of methanol, and the solution is evaporated. 2,5,7 - trimethyl-2-(4',8',12'-trimethyl-tridecyl) - 6-formylaminochromane is obtained in the form of a colorless oil.

The same compound can be obtained with an equally good yield if instead of 3-formylamino-2,4-dimethyl-6-hydroxybenzene the equivalent quantity of 3-amino-2,4-dimethyl-6-hydroxybenzene is treated with phytol in formic acid under the same conditions.

10 gms. of 2,5,7-trimethyl-2-(4',8',12'-trimethyl-tridecyl)-6-formylaminochromane is dissolved in 200 cc. of 15% alcoholic hydrochloric acid, mixed with 20 cc. of water, and boiled under refluxing for one hour. On cooling and careful addition of water, the hydrochloride of 2,5,7 - trimethyl-2-(4',8',12'-trimethyl-tridecyl) - 6-aminochromane crystallizes out. The compound melts at about 140–142° C. The yield is almost quantitative. The compound shows strong vitamin-E action. (Administration of one dose of 3 mg. is effective with 60% of the rats used.)

In the same manner as described in Example I it is possible to hydrolise the crude 2,5,7-trimethyl - 2 - (4',8',12'-trimethyl - tridecyl) - 6-formylaminochromane by refluxing with aqueous-alcoholic hydrochloric acid and isolating the crude 2,5,7-trimethyl-2-(4',8',12'-trimethyl-tridecyl)-6-aminochromane. This can be transformed in alcoholic solution by oxalic acid in the pure oxalic acid salt

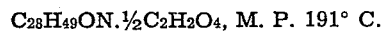

$C_{28}H_{49}ON.\tfrac{1}{2}C_2H_2O_4$, M. P. 191° C.

or by d-tartaric acid in the pure tartaric acid salt $C_{28}H_{49}ON.\tfrac{1}{2}C_4H_6O_6$, M. P. 128° C.

The 2,5,7-trimethyl-2-(4',8',12'-trimethyl-tridecyl)-6-p-nitrobenzaminochromane forms yellow crystals (M. P. 147° C.).

By diazotizing and boiling of the 2,5,7-trimethyl-2-(4',8',12'-trimethyl-tridecyl)-6-aminochromane, 2,5,7-trimethyl-2-(4',8',12'-trimethyl-tridecyl)-6-hydroxychromane is obtained.

*Example VI*

6.6 gms. of 3-formylamino-1,4-dimethyl-6-hydroxybenzene, (prepared from 3-amino-1,4-dimethyl-6-hydroxybenzene, by boiling with formic acid), 12 gms. of phytol, and 60 cc. of 99% formic acid are boiled under refluxing for six hours in a current of nitrogen. The working up proceeds in the same manner as in Example V and gives 2,5,8-trimethyl-2-(4',8',12'-trimethyl-tridecyl)-6-formylaminochromane as a colorless, viscous oil.

Saponification of this compound with aqueous-alcoholic hydrochloric acid is carried out at a boiling temperature under nitrogen. The hydrochloride of 2,5,8-trimethyl-2-(4',8',12'-trimethyl-tridecyl)-6-aminochromane separates out as an oil and is purified by dissolving and reprecipitating from alcoholic hydrochloric acid.

The base shows vitamin-E activity. One dose of 10 mg. of the base is effective with 60% of the rats used in the animal test. With p-nitrobenzoylchloride in pyridine solution the base gives crystalline 2,5,8-trimethyl-2-(4',8',12'-trimethyl-tridecyl) - 6 -p-nitrobenzaminochromane, M. P. 80° C.

The conversion of the amino group into the hydroxyl group is carried out by diazotizing and boiling, and yields d,l,-β-tocopherol.

*Example VII*

3.34 gms. of 3-nitro-6-hydroxy-2,4-dimethylbenzene, 6.0 gms. of phytol and 30 cc. of 99% formic acid are boiled for five hours under refluxing. After cooling, the mixture is diluted with water and the yellow oil which separates out is taken up in ether. The ether solution is drawn off and treated with dilute sodium hydroxide solution until the solution turns an orange-red color (phenolphthalein-alkaline reaction). After separation of the layers the ether solution is dried and evaporated.

The residue is dissolved in a little alcohol, in which the substituted nitrochromane is soluble, whereas a few drops of the oil remain undissolved. The solution is evaporated to dryness and the residue is distilled under vacuum at 0.05 mm. and in air bath temperature of 170–200° C. 2,5,7-trimethyl- 2 -(4',8',12'-trimethyl-tridecyl) - 6 -nitrochromane in the form of a yellow oil is obtained.

2.17 gms. of 2,5,7-trimethyl-2-(4',8',12'-trimethyl-tridecyl)-6-nitrochromane is dissolved in 80 cc. of alcohol, treated with 1 cc. of hydrochloric acid (d. 1.19), and after the addition of 2 gms. of 10% palladium charcoal, is hydrogenated catalytically. When the calculated amount of hydrogen is absorbed, the solution is filtered from the catalyst and evaporated under vacuum. The crystallized residue is 2,5,7-trimethyl-2-(4',8',12'-trimethyl-tridecyl)-6-aminochromane-hydrochloride and is recrystallized from dilute alcoholic hydrochloric acid.

2,5,7-trimethyl-2-(4',8',12'-trimethyl-tridecyl)-6-p-nitrobenzaminochromane, obtained from the base with p-nitrobenzoyl chloride in a pyridine solution shows a melting point of about 147° C.

*Example VIII*

3.34 gms. of 3-nitro-6-hydroxy-2,4-dimethylbenzene is boiled for five hours under refluxing with 1.8 gms. anhydrous zinc chloride and 7.5 gms. of phytyl bromide in 25 cc. of benzine having a boiling point of 80–120° C. Hydrobromic acid escapes. The mixture is taken up in ether. The ethereal solution is shaken out with dilute sodium hydroxide solution and thereafter with dilute hydrochloric acid. The ether solution is dried and evaporated. The further working up to 2,5,7-trimethyl-2-(4',8',12'-trimethyl-tridecyl)-6-amino-chromane takes place as described in Example I.

Where the term "amino radical" is used in the claims it covers both the amino radical, NH₂ itself, and substituted amino radicals.

This application is a continuation-in-part of my application Serial No. 272,679, filed May 9, 1939.

Processes for producing salts of the 6-amino chromane compounds disclosed herein and the salts thus produced form the subject matter of a divisional application Serial No. 395,444, filed May 27, 1941.

I claim:

1. A compound of the formula

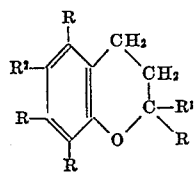

wherein R is selected from the group consisting of hydrogen and methyl, R¹ is an alkyl radical, and R² is an amino radical.

2. 2,5,7,8-tetramethyl-2-alkyl-6-a m i n o chromane.

3. 2, 5, 7, 8-tetramethyl-2-(4', 8', 12'-trimethyl-tridecyl)-6-amino chromane.

4. 2,5,7,8-tetramethyl-2-alkyl-6-a c y l a m i n o chromane.

5. 2, 5, 7, 8-tetramethyl-2-(4', 8', 12'-trimethyl-tridecyl)-6-acylamino chromane.

6. The process for the production of 6-amino chromanes comprising condensing a compound of the formula

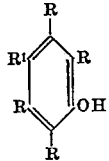

wherein R is selected from the group consisting of hydrogen and methyl, one R ortho to the hydroxyl group being hydrogen, and R¹ is an amino radical, with a substance selected from the group consisting of aliphatic α-gamma-dialkylated dienes, gamma-gamma-dialkylated allylic halides, and gamma-gamma-dialkylated allylic alcohols, in the presence of an acidic substance.

7. The process for the production of 6-amino chromanes comprising condensing a 6-hydroxy-3-amino benzene, in which one position ortho to the hydroxyl group is unsubstituted, with a substance selected from the group consisting of aliphatic α-gamma-dialkylated dienes, gamma-gamma-dialkylated allylic halides, and gamma-gamma-dialkylated allylic alcohols, in the presence of an acidic substance.

8. The process for the production of 6-amino chromanes comprising condensing a 6-hydroxy-3-acylamino benzene, in which one position ortho to the hydroxyl group is unsubstituted, with a substance selected from the group consisting of aliphatic α-gamma-dialkylated dienes, gamma-gamma-dialkylated allylic halides, and gamma-gamma-dialkylated allylic alcohols, in the presence of an acidic substance.

9. The process for the production of a 2,5,7,8-tetramethyl-2-(4',8',12'-trimethyl-tridecyl)-6-amino chromane comprising condensing a 3-amino-6-hydroxyl-1,2,4-trimethyl benzene with phytol, in the presence of an acidic substance.

10. The process for the production of a 2,5,7,8-t e t r a methyl-2-(4',8',12'-trimethyl-tridecyl)-6-amino chromane comprising condensing a 3-amino-6-hydroxyl-1,2,4-trimethyl benzene with phytyl bromide, in the presence of an acidic substance.

11. A 2, 5, 7-trimethyl-2-alkyl-6-a m i n o chromane.

12. A 2,5,7-trimethyl-2-(4',8',12'-trimethyl-tridecyl)-6-amino chromane.

13. A 2,5,8-trimethyl-2-alkyl-6-a m i n o chromane.

14. A 2,5,8-trimethyl-2-(4',8',12'-trimethyl-tridecyl)-6-amino chromane.

15. The process for the production of a 2,5,7-trimethyl-2-(4',8',12'-trimethyl-tridecyl)-6-amino chromane comprising condensing 3-amino-2,4-dimethyl-6-hydroxybenzene with phytol, in the presence of an acidic substance.

16. The process for the production of a 2,5,7-trimethyl-2-(4',8',12'-trimethyl-tridecyl)-6-amino chromane comprising condensing 3-amino-2,4-dimethyl-6-hydroxybenzene with phytyl bromide, in the presence of an acidic substance.

17. The process for the production of a 2,5,8-trimethyl-2-(4',8',12'-trimethyl-tridecyl)-6-amino chromane comprising condensing 1,4-dimethyl-6-hydroxybenzene with phytol, in the presence of an acidic substance.

18. The process for the production of a 2,5,8-trimethyl-2-(4',8',12'-trimethyl-tridecyl)-6-amino chromane comprising condensing 1,4-dimethyl-6-hydroxybenzene with phytyl bromide, in the presence of an acidic substance.

19. A compound of the formula:

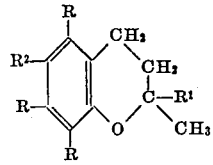

wherein R is selected from the group consisting of hydrogen and methyl, R¹ is an alkyl radical, and R² is an acylamino radical.

20. A compound of the formula:

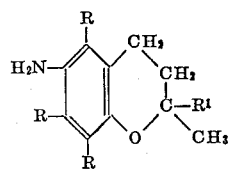

wherein R is selected from the group consisting of hydrogen and methyl, and R¹ is an alkyl radical.

21. A compound of the formula:

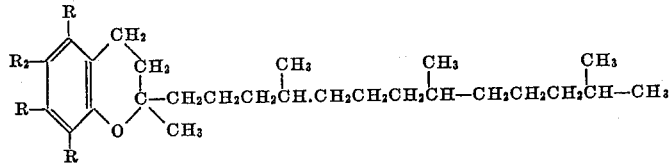

wherein R is selected from the group consisting of hydrogen and methyl, and R² is an acylamino radical.

22. A compound of the formula:

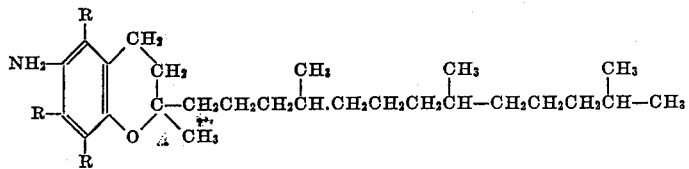

wherein R is selected from the group consisting of hydrogen and methyl.

23. The process which comprises reacting upon a 4-acylamino-phenol having a free position ortho to the hydroxyl group with phytyl bromide in the presence of an acid condensing agent, splitting off the acyl group from the 6-acylamino-2-methyl-2-(4′,8′,12′-trimethyl-tridecyl)-chromane formed by saponification, and converting the free amino group thus formed by diazotizing and boiling in aqueous solution.

OTTO HROMATKA.

Certificate of Correction

Patent No. 2,358,286. September 12, 1944.

OTTO HROMATKA

It is hereby certified that errors appear in the printed specification of the above numbered patent requiring correction as follows: Page 2, second column, lines 27 to 33, for that portion of the formula reading

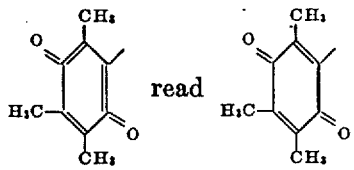

page 5, first column, line 2 from bottom and second column, line 4, claims 9 and 10, for "hydroxyl" read *hydroxy*; and that the said Letters Patent should be read with these corrections therein that the same may conform to the record of the case in the Patent Office.

Signed and sealed this 23rd day of January, A. D. 1945.

[SEAL]

LESLIE FRAZER,
*Acting Commissioner of Patents.*